SUBJECT TESTS SHOWING:
ACTUAL IN VIVO CHANGES IN CLOTTING FACTORS

United States Patent Office 3,156,616
Patented Nov. 10, 1964

3,156,616
COMPOSITION AND METHOD FOR CORRECTING FOODS AND BLOOD CONDITIONS HAVING CLOT PROMOTING CHARACTERISTICS
James Fraser Mustard, Toronto, Ontario, Canada, assignor to Her Majesty in right of Canada
Filed Nov. 14, 1958, Ser. No. 774,004
4 Claims. (Cl. 167—65)

This invention relates to a digestible composition of matter for controlling the rate of blood clotting and containing a non-side reaction coagulation inhibitor consisting of phosphatidyl serine. The invention also relates to a process for reducing the blood clotting rate or coagulation activity in human and animal blood by feeding to or injecting into the human or animal phosphatidyl serine in a compatible vehicle.

More than one hundred years ago, Rokitansky C. (Handbuch der pathologischen Anatomie, Braumuller, u., Seidel, Wien, 1842–46,) suggested that atherosclerosis was the result of a deposit on the lining of blood vessels caused by a "crasis" in circulating blood. Duguid J. B. (Lancet, 1:891, 1954), has revived this concept and he and others (Harrison, J. Path. Bact. 60: 289, 1948; Geiringer, J. Path. Bact., 63, 201, 1951; Heard, J. Path. Bact., 64: 13, 1952; Crawford and Levene, J. Path. Bact., 64: 523, 1952; Morgan, The Pathogenesis of Coronary Occlusion, Oxford, 1956) have presented evidence that fibrin, incorporated into the intima following deposition on the endothelium, forms some of the material in atherosclerotic plaques. Therefore, increased activity of the coagulation mechanism may be the "crasis" which leads to deposition of material from circulating blood on the lining of arteries. There is evidence that lipids play a role in coagulation and that some accelerate clotting (Cramer and Pringle, Quart. J. Exp. Physiol., 6: 1, 1913, Robinson, Harrison and Poole, Quart. J. Exp. Physiol., 42: 285, 1957; O'Brien, J. R., Brit. J. Exp. Path., 38: 529, 1957). Abnormal lipid metabolism appears to be associated with atherosclerotic vessel disease (Ahrens, Hirsch, Insull, Tsaltas, Bloomstrand, and Peterson, J.A.M.A., 164: 1905, 1957). All this evidence suggests there may be a link between fat, blood coagulation and the development of atherosclerosis and its complications.

The fluidity of circulating blood is maintained by a balance between the clot inhibiting and clot promoting forces (Tocantins, Carroll, Holburn, Blood, 6: 720, 1951). Increase of the clot inhibiting component makes circulating blood less coagulable. Similarly, increase of some clot promoting material makes blood more coagulable. The clot promoting factors can be divided into two groups; one, those which are essential for clotting to occur but do not appear to have much accelerating effect on clotting. These are, prothrombin, Factor V, antihaemophilic globulin (AHG), (Factor VIII) fibrinogen and intact platelets; two, those which have a catalytic or accelerating action, Factor VII, Christmas factor (Factor IX), thrombin, blood thromboplastin and possibly products from disintegrated platelets. The less clearly defined clotting factors, such as P.T.A., Stuart factor, Prower factor or the Hageman trait will not be referred to in this specification except to point out that there is evidence that some or all may be important in coagulation.

Experimental studies have shown that there is a marked difference between the effects of the intravenous administration of fractions of unclotted blood and clotted blood on in vivo clotting. The intravenous infusion of plasma containing unclotted blood into dogs does not cause thrombosis in an occluded vein while the infusion of serum containing blood does (Wessler, S., J. Clin. Invest., 36: 647,1955). Serum is rich in Factor VII activity, Christmas factor activity and the material from disintegrated platelets. During clotting, Factor VII (Seegers, W. H., and Alkjaersig, N., Circ. Res., 3: 510, 1955) activity and Christmas factor activity (Koller, F., Baer, P., and Geiger, M., Acta Haemat., 18: 33, 1957) are derived from precursors and platelets are altered to release a thromboplastin factor (Bergsagel, D. E., Brit. J. Haemat., 2: 130, 1956). Therefore, the invention contemplates that anything which leads to these factors becoming active, or release of material from platelets, might lead to accelerated activity of the clotting mechanism.

Some phospholipids appear to have an activity in promoting clotting similar to the material from disintegrated platelets (O'Brien, J. R., J. Clin. Path., 9: 47, 1956). Part of the phospholipid material which accelerates clotting is phosphatidyl ethanolamine (Robinson, D. S., Harris, P. M., and Poole, J. C. F., Quart. J. Exp. Physiol., 42: 285, 1957) (Rousser, G., and Schloredt, D., ibid., 28: 81, 1958). Thus, variations in the plasma level of this lipid can change the activity of the coagulation mechanism. Furthermore, since phospholipids are important in thromboplastin formation, changes are most noticeable in clotting factors which normally react with platelets and platelet material. These are platelets, Christmas factor, AHG, Factor V and prothrombin. During the formation of blood thromboplastin, there is an increase in Christmas factor activity, a reduction in AHG activity and in platelet numbers. Changes in the activity of these factors may be used as an index of the in vivo changes in coagulation during alimentary lipemia. A reduction in the circulating platelet count and AHG activity and increase in Christmas factor activity can therefore be interpreted as indicating acceleration of the blood thromboplastin mechanism.

Known anticoagulants utilizable for the experimental adjustment of blood coagulation rate in laboratory studies are not adapted for oral human consumption by reason of toxicity for blood constituents or other incompatibility. Therefore, while in vitro control of blood coagulation and activity has been demonstrated by numerous investigators, corresponding in vivo control has been accomplished only under exacting conditions.

In vitro experiments indicate that butter contains a material active in thromboplastin generation. Other investigators using different tests have also concluded that butter contains a factor which is active in clotting (MacLagan, N. F., and Billimoria, J. D., Lancet, 2: 235, 1956; Kingsbury, K. J., and Morgan, D. C., Clin. Sc., 16: 689, 1957). The studies carried out after adding phospholipids to butter and margarine show that one factor governing the activity of dietary fat in clotting is phospholipid. Phosphatidyl ethanolamine is a phospholipid which accelerates clotting (Robinson, D. S., Harris, P. M., and Poole, J. C. F., Quart. J. Exp. Physiol., 42: 285, 1957; O'Brien, J. R., Brit. J. Exp. Path., 38: 529, 1957; Rousser, G., and Schloredt, D., Biochem. & Biophys. Acta 28: 81, 1958). Butter is known to contain this material. (Deuel, H. J., The Lipids, Their Chemistry and Biochemistry, Interscience Publishers, Inc., New York, 1951.)

The phospholipid composition of fat determines to some extent the in vivo coagulation changes in a susceptible subject. The acceleration of clotting following meals of margarine to which phosphatidyl ethanolamine has been added demonstrates that this phospholipid has a coagulant action. Robinson et al. (Quart. J. Exp. Physiol., 42: 285, 1957) state that the entry of phosphatidyl ethanolamine into the plasma during the absorption of a fatty meal provides a relatively large increase in the plasma level of this phospholipid. This interpretation is in accord with the work of this applicant and from studies in which $P^{32}$ and $C^{14}$ labelled phospholipids were fed to cats and rats (Bloom, B., Kiyasu, J. Y., Reinhardt, W. D. and Chairkoff, T. L., Am. J. Physiol., 177: 84, 1954; Bloomstrand, R., Acta Physiol. Scandinav., 34: 147, 1955. The latter investigations indicated that animals absorb up to 20 percent of ingested phospholipid without alteration.

Fats which are rich in phospholipids such as phosphatidyl ethanolamine, have an effect on the clotting system (Robinson et al., Quart. J. Exp. Physiol. 42: 285, 1957; MacLagan and Billimoria, Lancet, 2: 235, 1956; Kingsbury and Morgan, Clin. Sc. 16: 689, 1957). Therefore, since thromboembolism is an important factor in causing complications of atherosclerotic vessel disease this effect of fats is of some importance. Two dietary sources of the phospholipid phosphatidyl ethanolamine are dairy fats and egg yolks (butter contains approximately 40 mg. of phosphatidyl ethanolamine per 100 gm. and egg yolk 3–6 gm. per 100 gm.) (Deuel, The Lipids, Their Chemistry and Biochemistry, Interscience Publishers Inc., New York, 1951; Rhodes and Lea, Biochem. J., 65: 526, 1957).

From the foregoing it would appear that the phospholipid compensation of the diet is important. The butter and egg meal given in the previous studies contained approximately 1200 mg. of phosphatidyl ethanolamine. Assuming 20 percent to be absorbed without hydrolysis this would mean approximately 240 mg. may be present in the circulating blood. This could produce a plasma level of about 10 mg. per 100 ml. in the average adult. Kingsbury and Morgan, Lancet, 2: 212, 1957, found that increase of the plasma phospholipids by 5 to 10 mg./100 ml. accelerates clotting. The intravenous infusion of phospholipid preparations in humans and experimental animals is reported to increase clotting (Spaet, T. H., and Kropatkin, Proc. Soc. Exp. Biol. and Med., N.Y., 1957; Gobbi and Stefanini, J. Clin. Invest., 37: 897, 1958).

The most readily available source of anticoagulant herein at the present time is Folch Fraction III prepared as described by Journal Biological Chemistry, vol. 146, page 35 (1942). Folch Fraction III comprises a mainly unsaturated form of phosphatidyl serine as contrasted with a fully hydrogenated form available as a synthetic material containing saturated fatty acids and inoperative for purposes of the invention.

Folch Fractions III and V were prepared from human brain by the method of Folch. Folch Fraction III was considered to consist mainly of phosphatidyl serine and will be referred to as such herein. Similarly, Folch Fraction V will be referred to as phosphatidyl ethanolamine.

It is the primary object of this invention to provide an anticoagulant adapted for in vivo use as well as for in vitro application, and which may be introduced to the human by injection with a vehicle or may be absorbed by the human with food, the said inhibitor of the invention being compatible with foods and adapted for administration with the latter as a vehicle.

It is a further object of the invention to provide a blood coagulant inhibitor adapted to control the coagulation rate in blood and adapted to be administered in a fatty vehicle for humans by digestion.

It is a still further object of the invention to provide in combination with foods containing phospholipids having a clot promoting characteristic in blood a coagulation inhibitor comprising a selected phospholipid in the form of phosphatidyl serine added thereto to decrease the effect of the clot promoting factor of said phospholipids.

Other objects of the invention will be appreciated by a study of the following specification taken in conjunction with the accompanying drawings.

In the drawings:

FIGURE 1 demonstrates the effect on the thromboplastin generation test described herein, of selected natural food substances showing the effect on coagulation as measured in percent thromboplastin over time in minutes.

FIGURE 2 demonstrates the effect of the addition of phosphatidyl serine according to the invention to said food substances to control the coagulation activity thereof on the blood system;

FIGURE 3 demonstrates that the increase in clotting factor rate in a thromboplastin generation system is clearly attributable to the phospholipid content and largely phosphatidyl ethanolamine content of the phospholipids of the foods of the previous figures, and further demonstrates the inhibiting effect discovered according to this invention of phosphatidyl serine in reducing the magnitude of the clotting factor of phospholipids.

The following experiments show the effect of different materials on thromboplastin formation. The thromboplastin generation test was carried out as described by Biggs, R., and Douglas, A. S., Journal of Clinical Pathology, vol. 6, page 23, 1953, using modifications described by this applicant (Canadian Medical Association Journal, vol. 77, page 308, 1957).

The phospholipids and other lipids and materials tested (at 37° C.) were suspended in imidazole buffer pH 7.3. They were used in place of platelets in the generation mixture. The phospholipids were prepared from human brain by the method of Folch. Folch Fraction III was used as the source of phosphatidyl serine and Folch Fraction V as the source of phosphatidyl ethanolamine.

EXAMPLE 1

*Thromboplastin Generation Test Using Platelets and Saline*

| Material used as platelet or lipid source in generation mixture | Incubation time in minutes | | | | | |
|---|---|---|---|---|---|---|
| | 1 | 2 | 3 | 4 | 5 | 6 |
| | Thromboplastin generated, percent | | | | | |
| Platelets | 4 | 6 | 12 | 70 | 85 | 85 |
| Saline, 0.85% | 4 | 4 | 6 | 8 | 7 | 6 |

In this example a saline solution was used in place of platelets in the thromboplastin generation test. The saline solution had not definite effect on the amount and rate of thromboplastin formation.

EXAMPLE 2

*Thromboplastin Generation Test Using Phosphatidyl Ethanolamine and Phosphatidyl Serine*

| Material used as platelet or lipid source in generation mixture | Incubation time in minutes | | | | | |
|---|---|---|---|---|---|---|
| | 1 | 2 | 3 | 4 | 5 | 6 |
| | Thromboplastin generated, percent | | | | | |
| Phosphatidyl ethanolamine, (0.1) mg./ml | 4 | 8 | 80 | 85 | 90 | 90 |
| Phosphatidyl serine, (0.1) mg./ml | 3 | 4 | 8 | 10 | 12 | 10 |

In this example phosphatidyl ethanolamine and phosphatidyl serine were used in place of platelets in the thromboplastin generation test. Phosphatidyl ethanolamine can be used to replace platelets, whereas phosphatidyl serine can not.

EXAMPLE 3

*Thromboplastin Generation Test Using Mixtures of Phosphatidyl Ethanolamine and Phosphatidyl Serine*

| Material used as platelet or lipid source in generation mixture | Incubation time in minutes | | | | | |
|---|---|---|---|---|---|---|
| | 1 | 2 | 3 | 4 | 5 | 6 |
| | Thromboplastin generated, percent | | | | | |
| Phosphatidyl ethanolamine: | | | | | | |
| 0.4 mg./ml. | 5 | 100 | 100 | 108 | 100 | 93 |
| 0.8 mg./ml. | 5 | 90 | 100 | 108 | 108 | 100 |
| Phosphatidyl serine, 0.4 mg./ml. | 0 | 1 | 4 | 4 | 3 | 2 |
| Phosphatidyl ethanolamine, 0.4 mg./ml. Phosphatidyl serine, 0.4 mg./ml. | 1 | 2 | 4 | 4 | 3 | 1 |
| Phosphatidyl ethanolamine, 0.4 mg./ml. Phosphatidyl serine, 0.08 mg./ml. | 1 | 4 | 5 | 6 | 18 | 20 |

In this example the effect of various mixtures of phospholipids on the thromboplastin generation was studied. The addition of phosphatidyl serine to phosphatidyl ethanolamine was found to inhibit the effect of the latter phospholipid in the test system.

EXAMPLE 4

Figure 1:
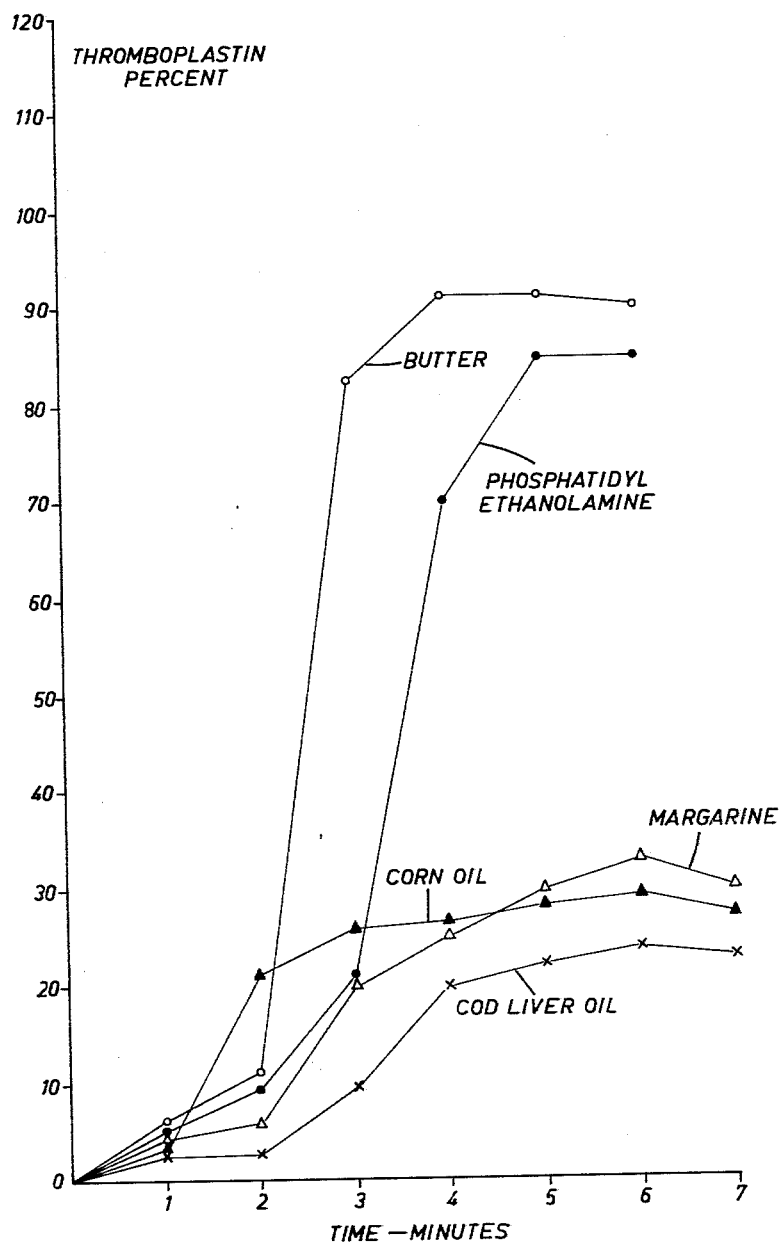

In FIGURE 1 the thromboplastin generation test using a normal serum, normal Al(OH)$_3$-treated plasma, is shown on the curve for the test system with the addition of phosphatidyl ethanolamine showing high percentage thromboplastin. The same test system was utilized to determine the effect of fats thereon by diluting each of the fats. The fluid fats (37° C.) were suspended in imidazole buffer pH 7.3. The fat mixture was emulsified in the buffer by agitation and this emulsion used instead of platelets (or brain extract) in the generation mixture.

Phosphatidyl ethanolamine is available in compatible form occurring in brain extract identified in Folch Fraction V (Journal Biological Chemistry, vol. 146, page 35 (1942)). The activity of the phospholipids of food substances in accelerating the clotting factor measured as percent thromboplastin over a period of time is demonstrated by the diagram and clearly indicates that some fatty substances contain a relatively balanced or insignificant phospholipid system, as for example, cod liver oil, corn oil or margarine as contrasted with butter, the latter having clot accelerating characteristic comparable to, if not exceeding that of phosphatidyl ethanolamine alone.

EXAMPLE 5

*Thromboplastin Generation Test Using Butter and Margarine Containing Phosphatidyl Serine*

| Material used as platelet or lipid source in generation mixture | Incubation time in minutes | | | | | |
|---|---|---|---|---|---|---|
| | 1 | 2 | 3 | 4 | 5 | 6 |
| | Thromboplastin generated, percent | | | | | |
| Butter | 5 | 40 | 108 | 115 | 108 | 108 |
| Butter phosphatidyl serine* | 2 | 3 | 5 | 6 | 7 | 1 |
| Margarine | 2 | 4 | 22 | 23 | 20 | 18 |
| Margarine phosphatidyl serine* | 1 | 2 | 3 | 4 | 3 | 2 |

*2 gm. phosphatidyl serine/480 gm. of margarine or butter.

Figure 2:
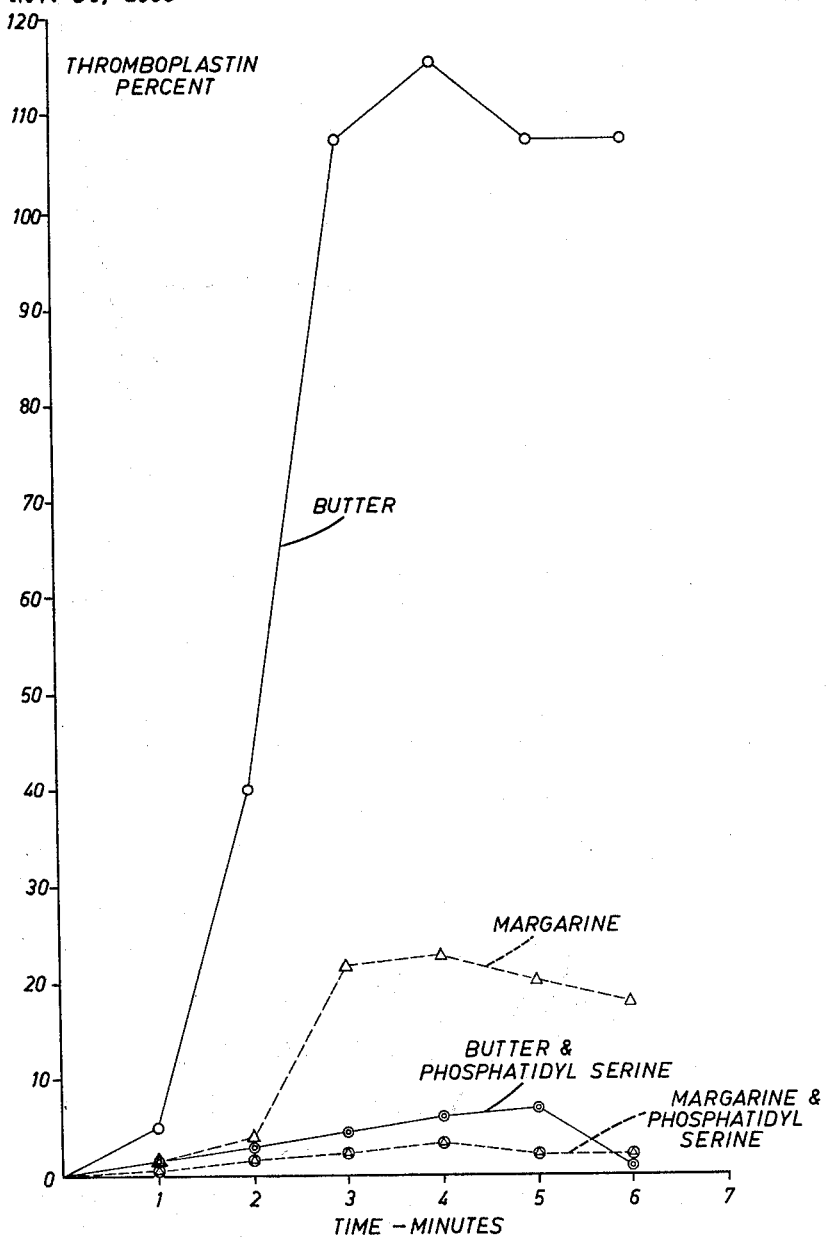

The addition of an adequate amount of phosphatidyl serine to butter or margarine inhibits the action of these dietary fats in the thromboplastin generation test as demonstrated in FIGURE 2.

EXAMPLE 6

*Thromboplastin Generation Test Using Carbohydrate and Phospholipids*

| Material used in place of platelets or lipid source in generation mixture | Incubation time in minutes | | | | | |
|---|---|---|---|---|---|---|
| | 1 | 2 | 3 | 4 | 5 | 6 |
| | Thromboplastin generation, percent | | | | | |
| A. Glucose (1 mg./ml.) in 0.85% saline | 0 | 1 | 2 | 3 | 4 | 1 |
| B. Glucose (1 mg./ml.) in 0.85% saline—Phosphatidyl serine (.04 mg./ml.) | 0 | 0 | 1 | 2 | 3 | 1 |
| C. Phosphatidyl ethanolamine (.04 mg./ml.) | 4 | 6 | 70 | 90 | 90 | 90 |
| B and C (1 part of each) | 0 | 1 | 2 | 4 | 6 | 8 |

Figure 3:
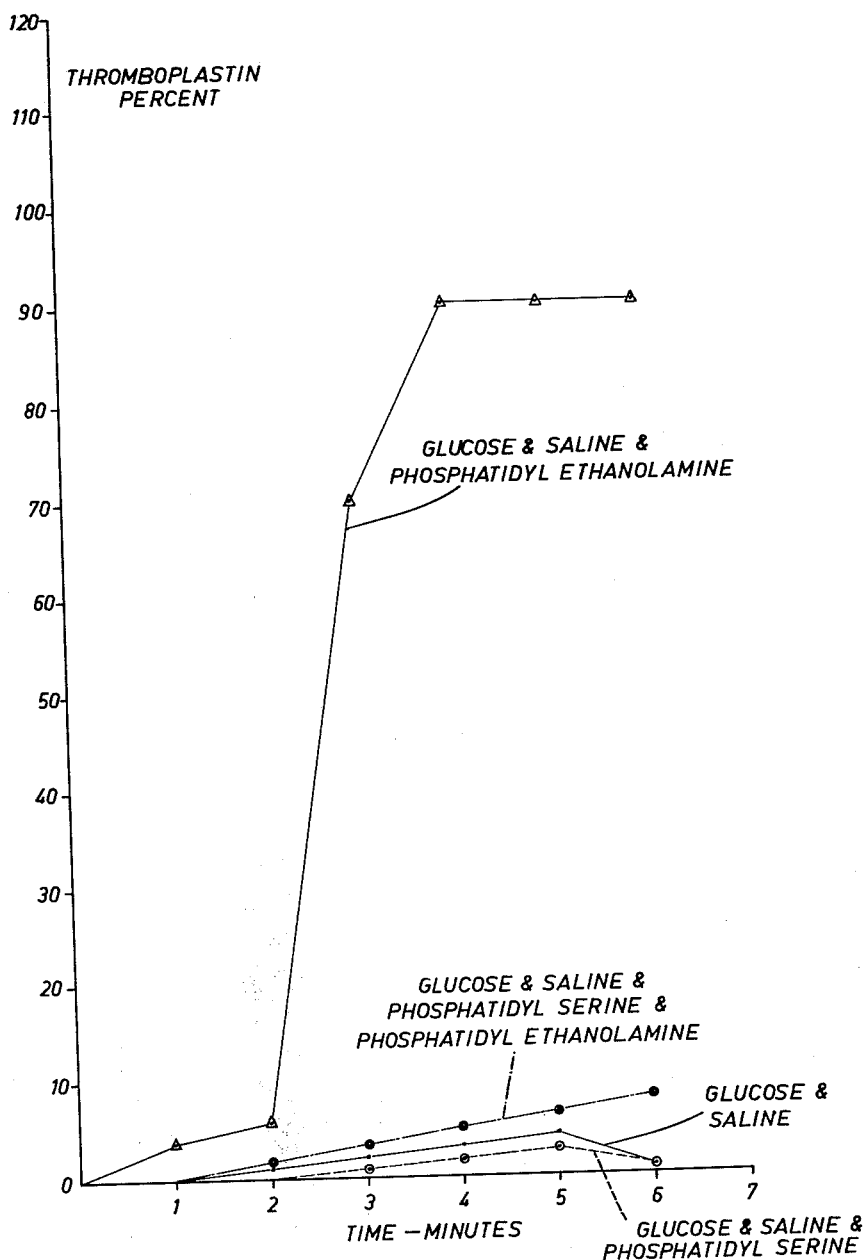

The addition of phosphatidyl serine in glucose to a phosphatidyl ethanolamine solution inhibits the activity of the latter phospholipid as is illustrated in FIGURE 3.

The nature of the coagulation mechanism in the fasting state and during alimentary lipemia was studied in 135 male subjects.

Of the 135 male subjects studied, group A comprised 52 subjects with clinical evidence of atherosclerosis; group B, 45 subjects with no clinical evidence of atherosclerosis, but a positive family history; group C, 38 subjects having no clinical evidence of atherosclerosis and of negative family history. The coagulation indices used in determining the nature of the fasting coagulation mechanism were as follows: The whole blood clotting time in silicone-coated glass tubes, the platelet count, the Russell Viper Venom Time (R.V.V.T.) and the activity of platelets, Al(OH)$_3$-treated plasma (aluminium hydroxide absorbed plasma), serum and dilute plasma in the thromboplastin generation test. During alimentary lipemia the changes in AHG and plasma Christmas factor activity were determined as well as the changes in the circulating platelet count. In addition, the changes in the W.B.C.T. (silicone) and R.V.V. time were determined. For the alimentary lipemia studies, the subjects were fed a meal containing 74 gms. of fat in bread, butter, bacon, eggs and cream.

The subjects ate nothing from 10:00 p.m. in the evening prior to the taking of the fasting blood sample in the morning. The subjects were then given the fat rich meal and blood samples for the clotting tests taken at hourly intervals after the first two hours for three more hours. The coagulations tests were carried out as described by this applicant with the following modifications:

*Thromboplastin generation test.*—Plasma (Christmas factor) activity: The activity of dilute plasma (diluted 1:10 with 0.85 percent saline) in thromboplastin generation was determined without using Christmas serum. This was done since it was found that the changes in the activity of plasma in thromboplastin generation, associated with thrombotic states and lipemia, were approximately the same whether or not Christmas serum was used. Since this change in the activity of dilute plasma improves the activity of Christmas serum, the activity will be referred to as plasma Christmas factor activity, although it is possible the changes as well represent alterations in other factors, such as the Hageman factor.

*AHG activity.*—This was determined as described by applicant in Canadian Medical Association Journal, vol. 77, page 208, 1957, except for the use of plasma in place of serum in the test system. Normal fasting plasma, diluted 1:10, was found to give a slower rate of thromboplastin generation than many serum preparations. The difference in rate of thromboplastin generation caused by variations in AHG activity was more easily demonstrated when four or five minutes of incubation were needed for the generation mixture to reach peak levels of thromboplastin formation. The use of dilute fasting plasma ensured that this was always the case, whereas some batches of serum were so active, maximum thromboplastin formation occurred in the first minute. The coagulation changes during the period of lipemia were determined as described.

Figure 4:
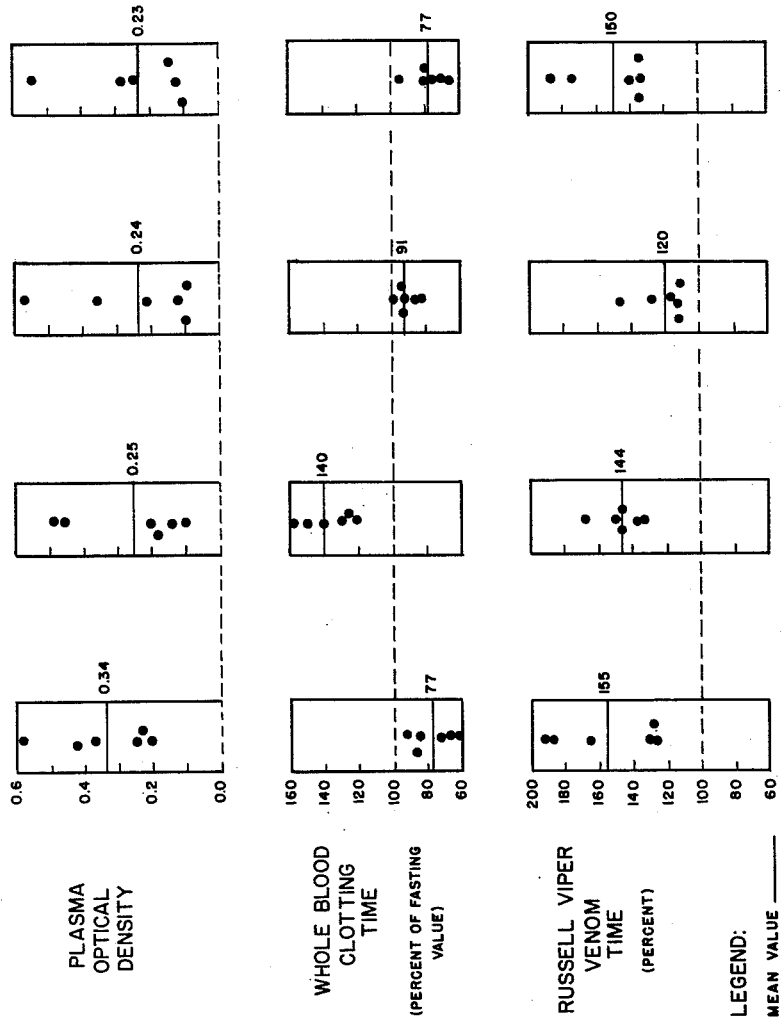
FIGURE 4 is a chart of maximum values of some characteristics for coagulation tests of six subjects fed special meals to illustrate the utility of the invention in controlling blood coagulation rate in vivo.
Figure 5:
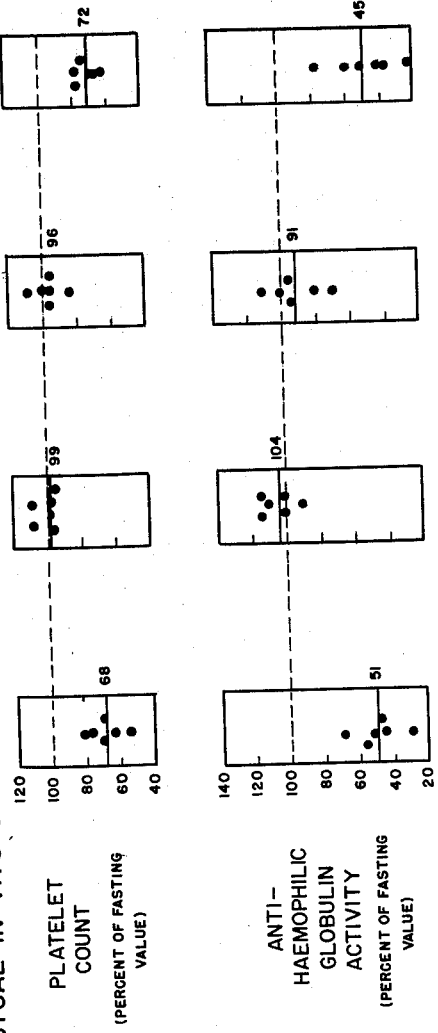
FIGURE 5 is a chart of maximum values of clotting factors for coagulation tests of six subjects fed special meals to illustrate the utility of the invention in controlling blood coagulation rate in vivo.
Figure 5:
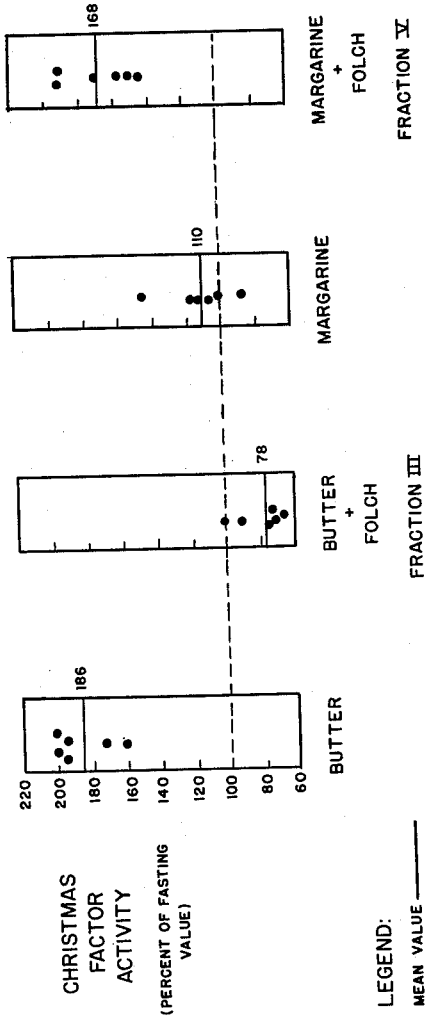

The in vivo effect of phosphatidyl serine as an anticoagulant was studied in 6 fasting subjects selected from Group B of the 135 subjects. The 6 fasting subjects were fed meals of butter. The maximum values for the cogulation tests for each of the 6 subjects during the alimentary lipemia after each meal was determined and recorded, the results being presented in FIGURES 4 and 5 hereof wherein the dotted line represents the fasting value in each instance. Th lipemic values for the clotting times, AHG activity, platelet numbers and Christmas factor activity are expressed in percent of the fasting values in each instance. The fasting value for the R.V.V.T. is expressed in percent of the lipemic value and therefore, acceleration of the R.V.V.T. is represented by an increase in percent.

During the alimentary lipemia following the butter meal for in vivo tests, each subject showed a decrease in platelet numbers and AHG activity and an increase in Christmas factor activity.

In contrast to the changes which occurred in subjects after the butter meal, there were no obvious changes in platelet numbers and AHG activity after the meal of butter containing phosphatidyl serine. The plasma Christmas factor activity was found to decrease in some of the subjects during the lipemia and in all subjects the whole blood clotting time was prolonged rather than accelerated. The Russell Viper Venom time, however, was accelerated to nearly the same extent as after the meal of unaltered butter.

The invention provides significant results in the control of the coagulation factor in the blood by introducing to the human system compatible digestible and/or edible substances of such nature that the corrective may be applied for atherosclerosis condition which appears to be related to clotting factor subject to control and/or alleviation.

Applicant herein has discovered unexpected and unobvious properties of a particular member of the phospholipid group, which properties are entirely contrary to and indeed serve as a natural corrective in part to the clot promoting characteristics of the remaining phospholipids. Moreover, it seems apparent that investigations to date have revealed that most materials containing phospholipids appear to have a clot promoting activity to a greater or lesser degree but in no instance does there appear to be any phospholipid group within any one food, so far as is known, which demonstrates any clot inhibiting characteristic. Phosphatidyl serine of the form occurring in natural phospholipids is capable of being extracted therefrom by known processes such as solvent extraction or other known techniques from which a non-hydrogenated form is available. At the present time, non-hydrogenated forms of phosphatidyl serine such as occur in Folch Fraction III, deemed herein to be comprised substantially of phosphatidyl serine, is preferred.

*Dosages.*—The utility of the invention can be realized in two main ways. On the one hand as illustrated by the above examples, phosphthatidyl ethanolamine occurring in the phospholipids of a food may be blocked in its clot promoting function by an equivalent weight of added phosphatidyl serine. It is to be observed, however, that phosphatidyl serine added to food is digestible with an efficiency of about 20% absorption only. Accordingly, in the example diets for FIGURES 4 and 5, five times the required blocking amount of phosphatidyl serine was added to butter in which it will be observed that 2 gms. of Folch Fraction III was mixed with 480 gms. of the butter sample for which the occurrence of phosphatidyl ethanolamine was of the order of 0.4 gm. per 480 gms. of butter. The addition of phosphatidyl serine to foods determined by the efficiency of absorption by digestion primarily may vary widely from almost unity with the occurrence of phosphatidyl ethanolamine to many times the occurrence of the latter depending upon digestive efficiency. It is of interest to observe that experiments have been conducted in which as much as 30 gms. have been given as a single dosage to patients with no resulting ill effects and with only an apparent reduction in the blood coagulation factor of the subject. It is observed, however, that the 30 gms. so taken were taken as an unadulterated form of Folch Fraction III. Applicant herein desires to make the specific observation that the digestion of phosphatidyl serine in solution and combination with a fat appears to render a more active absorption of the phosphatidyl serine by the human body. It is not intended by this statement to propose that the digestive process is important but rather that there may be some synergistic effect of enhanced activity of phosphatidyl serine causing the latter to be taken into solution within a fat for digestive absorption into the human system more efficiently than alone.

It has been determined that the normal dosage for purposes of injection to obtain an observable operative result is of the order of 30 to 40 mgm. per kilogram of body weight of the subject. Dosage by injection will ordinarily be used as a corrective measure for a patient's condition of relatively immediate effect. If desired, a remedial dosage can be administered orally in which instance the dosage should be multiplied by about a factor of five to compensate for lack of efficiency in the digestive process. An oral dosage may be accomplished by causing the phosphatidyl serine to be taken into solution by a fat or the same may be suspended in saline solution and taken orally for digestion. The maximum effect will be observed to take place between two to six hours after oral introduction.

It was not expected that ill effects would be observed from the introduction to the human system of phosphatidyl serine in amounts sufficient to block the action of phosphatidyl ethanolamine naturally occurring in foods. Nor has there been any evidence to indicate that the absorption by the human system of dosage quantities of phosphatidyl serine being in any case a natural food substance should give rise to ill effects or side effects and no such effects have been observed in dosages many times those required for subject treatment as above indicated.

Applicant specifically notes his discovery that phosphatidyl serine demonstrates an emulsifying characteristic and that the same may be regarded, at least in part, as an emulsifying agent in solution.

I claim:

1. A method for reducing the blood clotting rate in humans which results from ingested fatty foods containing blood clotting promoting factors consisting essentially of phosphatidyl ethanolamine, which comprises feeding humans fatty foods containing, as an additive for inhibiting the clotting of blood due to said phosphatidyl ethanolamine, Folch Fraction III, in an amount of from at least five times by weight, based on the weight of the phosphatidyl ethanolamine content of said food, to about 30 grams of said fraction to provide a normal dosage of said fraction with said food of at least 30 to 40 mgm. per kilogram of body weight of the human ingesting said food, whereby the blood clotting rate of said human is not increased by said food and the blood clotting promoting factors therein.

2. The method of claim 1 wherein said Folch Fraction III consists essentially of phosphatidyl serine.

3. An edible composition for ingestion by humans consisting of a fatty food containing blood clotting promoting factors consisting essentially of phosphatidyl ethanolamine which increase the blood clotting rate of humans; and, as an additive for inhibiting the clotting of blood caused by the said phosphatidyl ethanolamine content of said food, Folch Fraction II in an amount of from at least five times by weight, based upon the weight of the phosphatidyl ethanolamine content of said food to about 30 grams of said fraction, to provide a normal dosage of said fraction with said food of at least 30 to 40 mgm. per kilogram of body weight of the human ingesting said composition whereby the blood clotting rate of said human is not increased by said edible composition.

4. An edible composition as set forth in claim 3 wherein said Folch Fraction III consists essentially of phosphatidyl serine.

References Cited in the file of this patent

U.S. Dispensatory, 25th Ed., 1955, pp. 1734, 1735.
Fedn. Proceedings, vol. 15, March 1956, p. 189, Abs. No. 616.
Lancet, vol. 271, August 4, 1956, pp. 232–234.
C. and E. News, November 11, 1957, p. 21.
Silver: Amer. J. Physiology, vol. 190, 1957, pp. 8–12.
Fedn. Procs. 17:1, part 1, March 1958, p. 164, Abs. No. 652.
Folch: J. Biol. Chem., vol. 146, 1942, pp. 35–44.